United States Patent
Sakai (10) Patent No.: US 9,394,668 B2
(45) Date of Patent: Jul. 19, 2016

(54) BULLDOZER

(71) Applicant: KOMATSU LTD., Tokyo (JP)

(72) Inventor: Kiyotaka Sakai, Kaga (JP)

(73) Assignee: KOMATSU LTD., Tokyo (JP)

( * ) Notice: Subject to any disclaimer, the term of this patent is extended or adjusted under 35 U.S.C. 154(b) by 249 days.

(21) Appl. No.: 14/372,160

(22) PCT Filed: Apr. 26, 2013

(86) PCT No.: PCT/JP2013/062476
§ 371 (c)(1),
(2) Date: Jul. 14, 2014

(87) PCT Pub. No.: WO2014/174683
PCT Pub. Date: Oct. 30, 2014

(65) Prior Publication Data
US 2016/0115671 A1    Apr. 28, 2016

(51) Int. Cl.
*B60K 13/04*    (2006.01)
*E02F 9/20*    (2006.01)
(Continued)

(52) U.S. Cl.
CPC . *E02F 9/20* (2013.01); *B60K 13/04* (2013.01); *E02F 3/7631* (2013.01); *E02F 3/815* (2013.01); *E02F 9/0866* (2013.01); *F01N 3/206* (2013.01);
(Continued)

(58) Field of Classification Search
CPC ......... E02F 9/0866; E02F 9/20; E02F 9/0883; E02F 3/7631; E02F 3/815; F01N 13/1805; F01N 13/009; F01N 13/206; F01N 13/18; B60K 13/04
See application file for complete search history.

(56) References Cited

U.S. PATENT DOCUMENTS 8,739,918 B2 *  6/2014  Mariner .................. F01N 13/08
                                               180/309
8,931,585 B2 *  1/2015  Sakai .................... E02F 9/0866
                                               180/291

(Continued)

FOREIGN PATENT DOCUMENTS

JP    2005-113674 A    4/2005
JP    2008-240695 A    10/2008
(Continued)

OTHER PUBLICATIONS

The International Search Report for the corresponding international application No. PCT/JP2013/062476, issued on Jun. 11, 2013.

*Primary Examiner* — James M Dolak
(74) *Attorney, Agent, or Firm* — Global IP Counselors, LLP (57) ABSTRACT

A first exhaust treatment device, a second exhaust treatment device, and a relay connection pipe are disposed in front of an engine of a bulldozer. A relay connection pipe connects the first and second exhaust treatment devices. An injector assembly is attached to the relay connection pipe. The first exhaust treatment device, the relay connection pipe, and the second exhaust treatment device are arranged in sequence such that longitudinal directions thereof extend along the vehicle lateral direction. An attachment surface for the injector on the relay connection pipe is provided on an offset portion of the relay connection pipe at a connection portion between the first exhaust treatment device and the relay connection pipe. The distance between the injector assembly and a first side surface of the engine cover closest to the injector assembly is substantially equal to the distance between the first side surface and the first exhaust treatment device.

14 Claims, 8 Drawing Sheets

(51) Int. Cl.
  *E02F 3/76* (2006.01)
  *E02F 9/08* (2006.01)
  *F01N 13/18* (2010.01)
  *F01N 13/00* (2010.01)
  *E02F 3/815* (2006.01)
  *F01N 3/20* (2006.01)

(52) U.S. Cl.
  CPC .............. *F01N 13/009* (2014.06); *F01N 13/18* (2013.01); *F01N 13/1805* (2013.01); *B60Y 2200/411* (2013.01); *F01N 2340/04* (2013.01); *F01N 2590/08* (2013.01); *F01N 2610/00* (2013.01)

(56) References Cited

U.S. PATENT DOCUMENTS

| | | | | |
|---|---|---|---|---|
| 8,973,353 B2* | 3/2015 | Sawada | ...................... | F01N 3/10 60/286 |
| 8,973,692 B1* | 3/2015 | Okuda | ................ | B60L 11/1877 180/68.5 |
| 9,003,779 B2* | 4/2015 | Kanamori | ............... | F01N 3/208 60/295 |
| 9,010,480 B2* | 4/2015 | Sakai | ..................... | E02F 9/0866 180/309 |
| 9,016,428 B2* | 4/2015 | Numa | ................... | F01N 3/2066 180/296 |
| 9,027,688 B2* | 5/2015 | Okuda | ................... | B60K 13/04 180/89.2 |
| 9,074,343 B2* | 7/2015 | Okuda | ..................... | E02F 3/30 |
| 9,080,307 B2* | 7/2015 | Numa | ................... | B60K 11/06 |
| 9,157,214 B2* | 10/2015 | Tsumura | ............... | E02F 3/7609 |
| 9,175,455 B2* | 11/2015 | Sakai | ..................... | E02F 3/7631 |
| 9,316,136 B2* | 4/2016 | Kobayashi | ............. | B60K 13/04 |
| 2011/0079003 A1 | 4/2011 | Sun et al. | | |

FOREIGN PATENT DOCUMENTS

| | | |
|---|---|---|
| JP | 2012-154031 A | 8/2012 |
| JP | 2012-215022 A | 11/2012 |
| JP | 2012-240518 A | 12/2012 |

* cited by examiner

BULLDOZER

CROSS-REFERENCE TO RELATED APPLICATIONS

This application is a U.S. National stage application of International Application No. PCT/JP2013/062476, filed on Apr. 26, 2013.

BACKGROUND

1. Field of the Invention

The present invention relates to a bulldozer, which is one type of work vehicle.

2. Background Information

In Japanese Laid-Open Patent Publication 2005-113674, a bulldozer is disclosed in which the upper surface of the engine cover is tilted forward and downward (refer to Patent Japanese Laid-Open Patent Publication 2005-113674). With the bulldozer the workability is enhanced, since the operator is able visually to check the upper portion of the blade, i.e. of the working implement.

On the other hand, from the standpoint of protection of the natural environment, a work vehicle, such as a bulldozer, needs purifying of the exhaust (refer to the specification of US Laid-Open Patent Publication 2011/0079003A1). Therefore, it is nowadays practiced to mount an exhaust treatment device to a work vehicle. The term "exhaust treatment device" means, for example, a diesel particulate filter (DPF) device, a selective catalytic reduction (SCR) device, a diesel oxidation catalyst (DOC) device, or the like. Modern work vehicles need mounting, from these various exhaust treatment devices, of either two or more exhaust treatment devices of the same type, or two or more exhaust treatment devices of different types.

SUMMARY

When two or more exhaust treatment devices are disposed above the engine for the exhaust treatment devices to be housed in the engine compartment of the bulldozer described above, then it is necessary to raise the upper surface of the engine cover. When the upper surface of the engine cover is raised, then the region visible to the operator on the upper portion of the blade of the working implement becomes restricted, so that the workability is reduced.

Moreover, when these two or more exhaust treatment devices are disposed at the side of the engine, then the lateral width of the engine compartment becomes large. Generally, with a bulldozer, the cylinders that control the blade and the crawler belts are disposed at the side of the engine compartment. Moreover, in many countries, the lateral width of the vehicle is regulated according to a standard for road width. Therefore, the lateral width of the engine compartment is limited to being within such predetermined width. Accordingly, when a diesel particular filter device and a selective catalytic reduction device are both disposed at the side of the engine, then it becomes difficult to limit the lateral width of the engine compartment to being within the predetermined dimension. Furthermore, when the lateral width of the engine compartment becomes large, then the regions visible to the operator at the side portions of the blade of the working implement become restricted, and the workability is reduced.

Moreover, when two or more exhaust treatment devices are arranged in front of or behind the engine, such as the longitudinal direction of the devices being oriented along the vehicle front-back direction, then it is necessary greatly to elongate the longitudinal length of the engine compartment. In this case, the gap between the blade and the barycenter of the vehicle body becomes greater, so that the force transmitted to the blade is dissipated, and it becomes difficult to maintain digging force for the blade.

An objective of the present invention is to provide a bulldozer with which, even when two or more exhaust treatment devices are housed in the engine compartment, the longitudinal length and the lateral width of the engine compartment are minimized to maintain the visibility of the sides of the blade and the digging force of the blade.

The bulldozer according to the first aspect of the present invention includes a blade, an engine, a first exhaust treatment device, a second exhaust treatment device, a relay connection pipe, an injector assembly, and an engine cover. The first exhaust treatment device is disposed at the front of the engine, and treats exhaust from the engine. The second exhaust treatment device is disposed at the front of the engine, and treats exhaust from the engine. The relay connection pipe is disposed at the front of the engine, and connects the first exhaust treatment device and the second treatment device. The injector assembly is attached to the relay connection pipe, and includes an injector injecting a reducing agent into the interior of the relay connection pipe. The engine cover includes an upper surface sloping forward and downward. The engine cover covers the engine, the first exhaust treatment device, the second exhaust treatment device, the relay connection pipe, and the injector. The longitudinal directions of the first exhaust treatment device, the relay connection pipe, and the second exhaust treatment device are arranged in sequence such that the longitudinal directions thereof extend along the vehicle lateral direction. An attachment surface for the injector on the relay connection pipe is provided on an offset portion of the relay connection pipe, at a connection portion between the first exhaust treatment device and the relay connection pipe. The distance between a first side surface of the engine cover that is closest to the injector assembly and the injector assembly is substantially equal to the distance between that first side surface and the first exhaust treatment device.

The distance between the attachment surface and the first side surface in the longitudinal direction of the relay connection pipe may be greater than the length of the injector in the longitudinal direction of the relay connection pipe.

The bulldozer described above may further comprise a first cylinder and a second cylinder. The first cylinder is disposed at the left side of the engine cover, and controls a position or a posture of the blade. The second cylinder is disposed at the right side of the engine cover and controls the position or the posture of the blade. The distance between the first cylinder and the second cylinder may be greater than the width of the engine cover in the longitudinal direction of the relay connection pipe at the position of the injector.

The side surface of the engine cover that is closest to the injector assembly may include a bulging portion corresponding to the position of the injector.

The bulging portion may be formed as a cover that is a separate body from the engine cover.

The range of movement of that cylinder, among the first cylinder and the second cylinder, which is closest to the bulging portion, may not overlap the bulging portion, as seen from the side of the vehicle.

The relay connection pipe may be positioned above the first exhaust treatment device, and the second exhaust treatment device may be positioned above the relay connection pipe.

The side surface of the injector closest to the engine cover may be flat.

With the bulldozer according to the present invention, the first exhaust treatment device, the second exhaust treatment device, and the relay connection pipe are disposed at the front of the engine. Due to this, it is possible to suppress increase in the height of the upper surface of the engine cover, even though the first exhaust treatment device, the second exhaust treatment device, and the relay connection pipe are housed in the engine compartment. Accordingly, the region visible to the operator on the upper portion of the blade of the working implement is enlarged, so that deterioration of the workability can be prevented.

Moreover, the first exhaust treatment device, the relay connection pipe, and the second exhaust treatment device are arranged in sequence such that the longitudinal directions thereof extend along the vehicle lateral direction. The attachment surface for the injector on the relay connection device is provided on an offset portion of the relay connection pipe, at the connection portion between the first exhaust treatment device and the relay connection pipe. Yet further, the distance between the injector assembly and the first side surface of the engine cover which is closest to the injector assembly is substantially equal to the distance between the first side surface and the first exhaust treatment device. Due to this, it is possible to suppress increase of the longitudinal length and of the lateral width of the engine compartment.

DESCRIPTION OF EXEMPLARY EMBODIMENTS

Overall Structure

Figure 1:
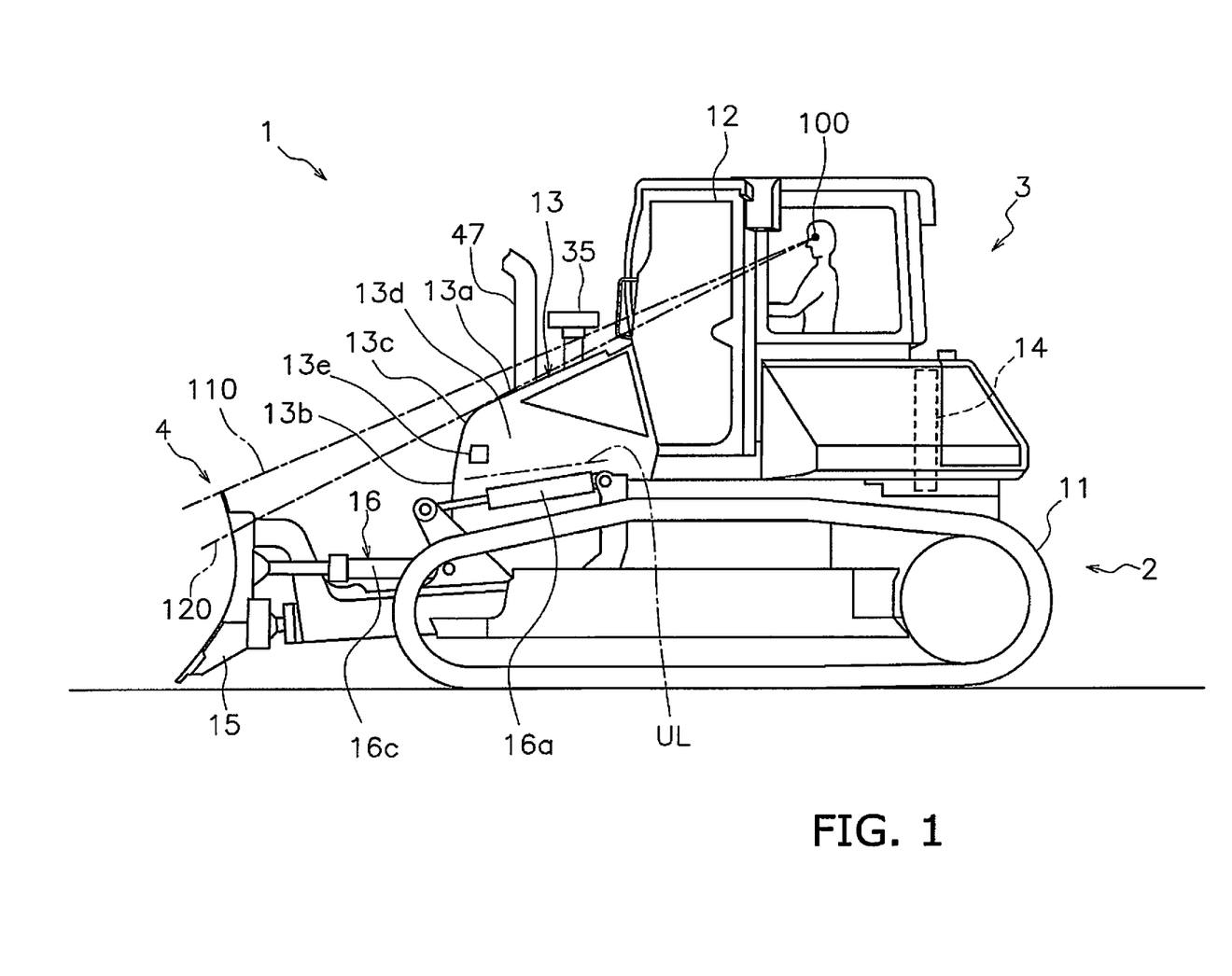
FIG. 1 is a left side view of a bulldozer according to an exemplary embodiment of the present invention.
Figure 2:
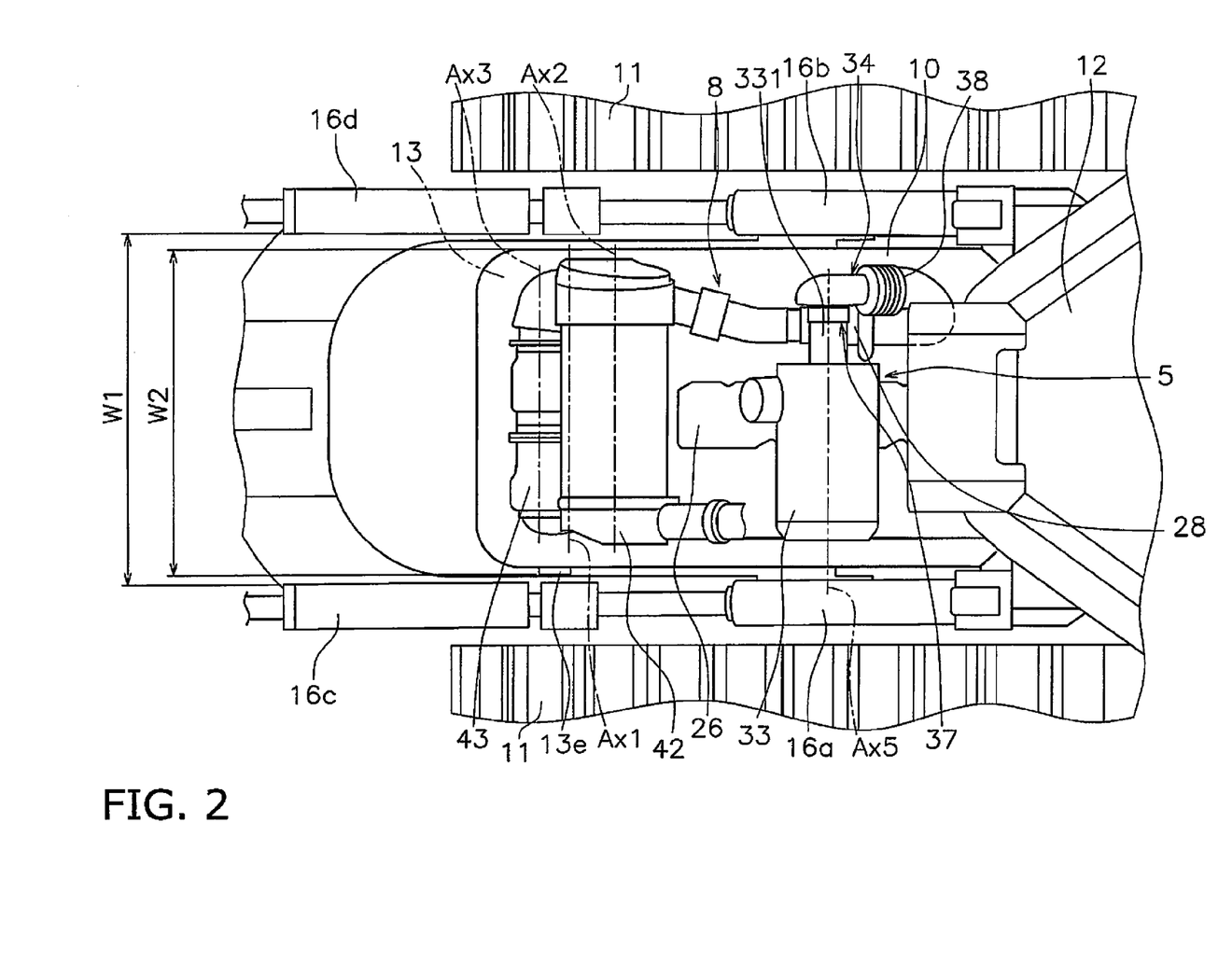
FIG. 2 is a top view illustrating a part of the bulldozer according to an exemplary embodiment of the present invention.

A left side view of a bulldozer 1 according to an exemplary embodiment of the present invention is shown in FIG. 1. A top view illustrating a part of the bulldozer according to this exemplary embodiment of the present invention is shown in FIG. 2. In FIG. 2, an engine compartment 8 is shown in a state in which an engine cover 13, which will be described hereinafter, has been removed. It should be understood that, in the following explanation, the "front/rear direction" means the front/rear direction of the bulldozer 1. To put it in other words, the front/rear direction means the front/rear direction as seen by an operator sitting in a cab (an operator compartment) 12. Moreover, the left/right direction means the left/right direction as seen by an operator sitting in the cab (the operator compartment). Furthermore, the lateral direction means the direction lateral to the vehicle, i.e. to the bulldozer 1; in other words, it means either one of the left direction and right direction described above.

The bulldozer 1 comprises a travelling unit 2, a main vehicle body 3, and a working implement 4. The travelling unit 2 is a device for driving the vehicle, and comprises crawler belts 11. The bulldozer 11 moves by driving the crawler belts 11.

The main vehicle body 3 comprises a vehicle body frame 10 (refer to FIG. 2), the cab 12, an engine cover 13, and a cooling device 14 (refer to FIG. 1). The engine cover 13 is disposed in front of the cab 12. An engine compartment 8 (refer to FIG. 2) in which an engine 5 is housed is positioned within the engine cover 13. The upper surface 13a of the engine cover 13 slopes upward towards the rear. The cooling device 14 is disposed behind the cab 12. It should be understood that, generally, with a bulldozer, the cooling device is disposed in front of the engine and within an engine cover that is in front of the cab. The cooling device 14 may, for example, include a radiator that cools the coolant liquid of the engine 5 and an oil cooler that cools hydraulic fluid.

The working implement 4 is provided in front of the engine cover 13. The working implement 4 comprises a blade 15 and a plurality of hydraulic cylinders 16. The blade 15 is provided to be capable of swinging in the vertical direction. As shown in FIG. 2, the hydraulic cylinders 16 include a first cylinder 16a, a second cylinder 16b, a third cylinder 16c, and a fourth cylinder 16d. The first cylinder 16a and the third cylinder 16c are disposed on the left side of the engine cover 13. The second cylinder 16b and the fourth cylinder 16d are disposed on the right side of the engine cover 13. The first cylinder 16a and the second cylinder 16b move the blade 15 up and down. The third cylinder 16c and the fourth cylinder 16d change the posture of the blade 15. The first to the fourth cylinders 16a to 16d control the position or the posture of the blade 15.

Structures Internal to the Engine Compartment

Figure 3:
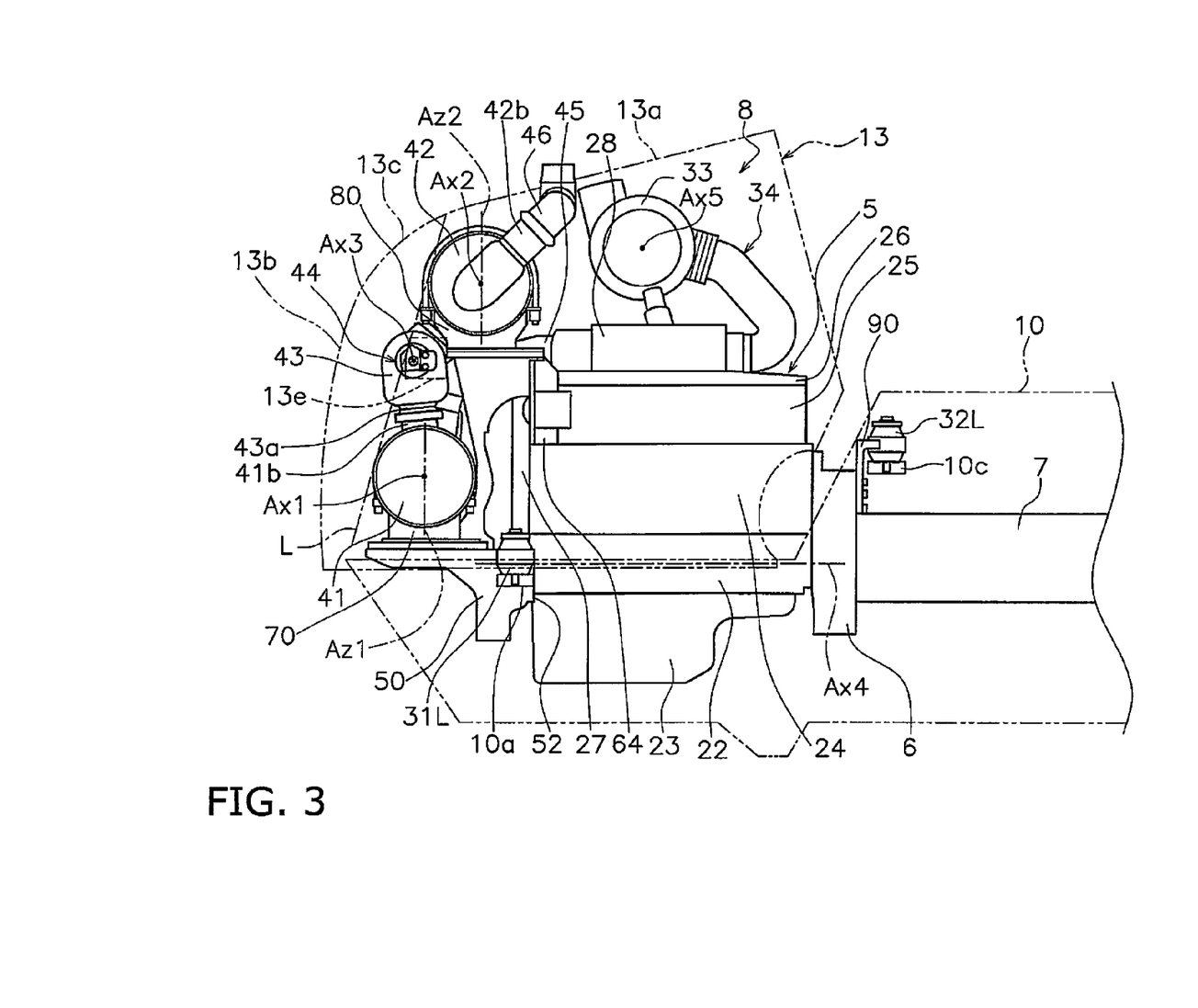
FIG. 3 is a left side view illustrating the internal structure of an engine compartment.
Figure 4:
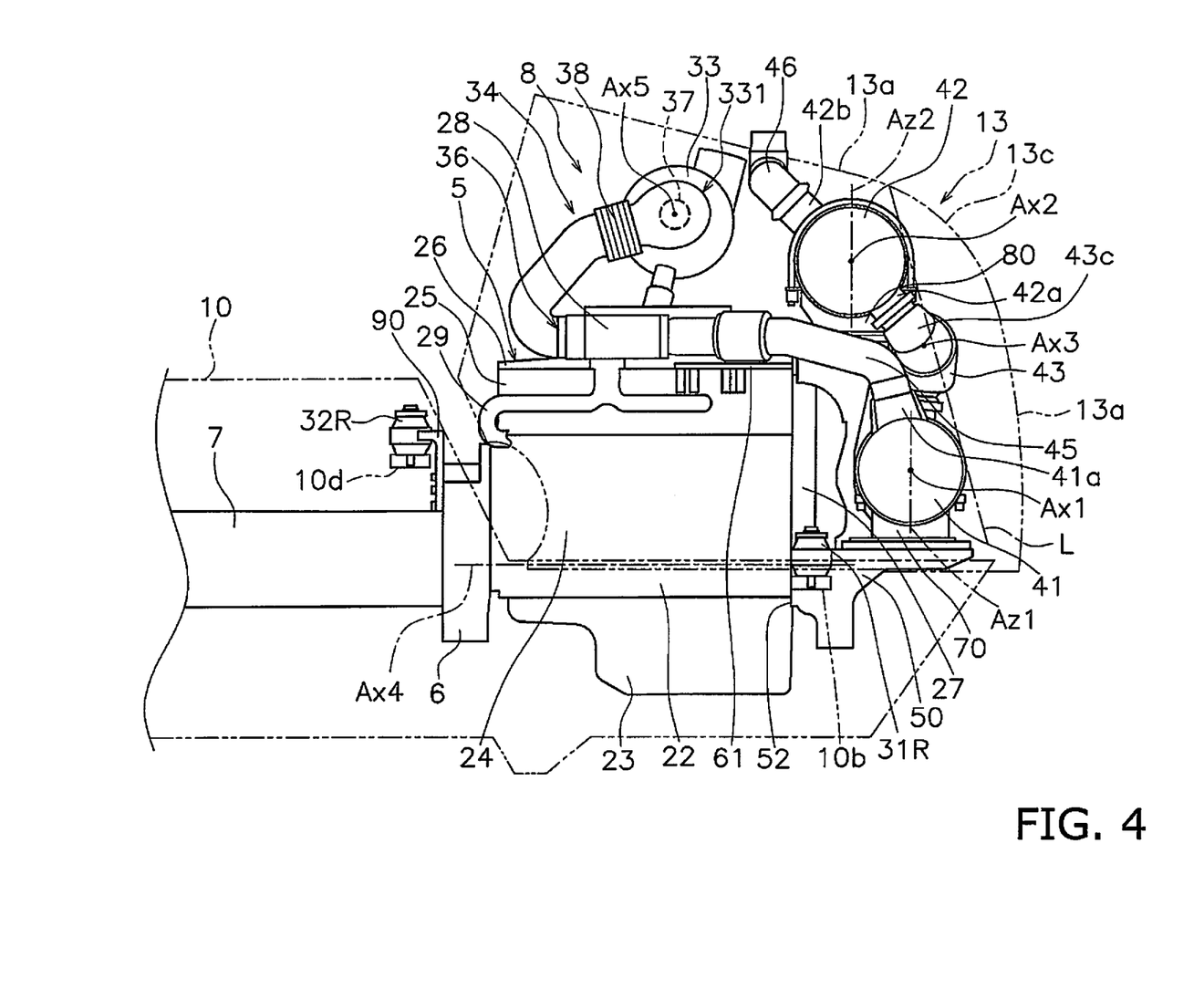
FIG. 4 is a right side view illustrating the internal structure of the engine compartment.
Figure 5:
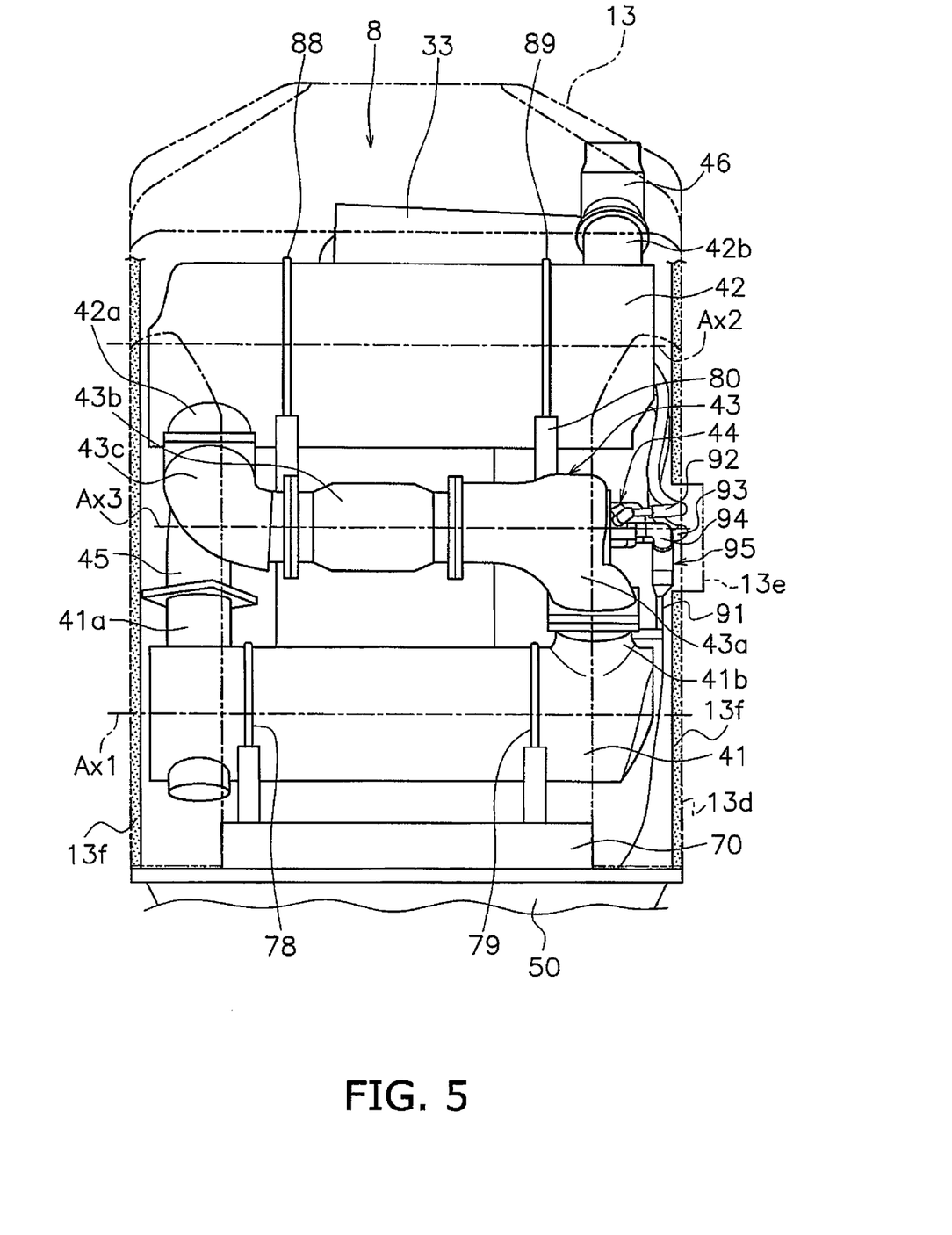
FIG. 5 is a front view illustrating the internal structure of the engine compartment.

FIG. 3 is a left side view illustrating the internal structure of the engine compartment 8 inside the engine cover 13. FIG. 4 is a right side view illustrating the internal structure of the engine compartment 8 inside the engine cover 13. The right side of FIG. 4 represents the front of the vehicle. FIG. 5 is a front view illustrating the internal structure of the engine compartment 8 inside the engine cover 13. It should be understood that, for ease of understanding, in FIGS. 3 and 4, the vehicle body frame 10 and the engine cover 13 are illustrated by chain double dashed lines. Moreover, in FIG. 5, the vehicle body frame 10 is omitted, and the engine cover 13 is illustrated by chain double dashed lines. Furthermore, in FIGS. 2 to 5, parts of the structures within the engine compartment 8 are appropriately omitted. As shown in FIGS. 2 to 4, the main vehicle body 3 comprises the engine 5, a flywheel housing 6 and a hydraulic pump 7. The engine 5 is disposed within the engine cover 13.

The engine 5 is a diesel engine, and the output of the engine 5 is controlled by the amount of injection of fuel from a fuel injection pump (not shown in the drawings) being adjusted. The engine 5 comprises a crankcase 22, an oil pan 23, a cylinder body 24, a cylinder head 25, and a cylinder head cover 26. Moreover, the engine 5 includes a crankshaft (not shown in the drawings). The crankshaft extends in the front and rear direction of the vehicle. The engine 5 is a so-called longitudinally disposed engine, and is arranged with its longitudinal dimension along the front and rear direction of the vehicle and its short dimension along the lateral direction of the vehicle. Because the width of the vehicle with this configuration can be shortened, accordingly it is possible to secure visibility to the left and right lower ends of the blade 15, as is required for a bulldozer. Ax4 in FIGS. 3 and 4 denotes the central axial line of the crankshaft. The crankcase 22 houses the crankshaft. A cam pulley (not shown in the drawings) is disposed in front of the crankcase 22. The crankshaft is connected to the cam pulley. As shown in FIGS. 3 and 4, a belt 27 is wound around the cam pulley. The oil pan 23 is disposed below the crankcase 22. The cylinder body 24 is disposed above the crankcase 22. Moreover, the cylinder head 25 is disposed above the cylinder body 24. The the cylinder head cover 26 is disposed above the cylinder head 25.

Furthermore, the engine 5 includes a supercharger 28. The supercharger 28 is connected to the cylinder head 25 via the exhaust pipe 29 of the engine 5 (refer to FIG. 4). As seen from the top of the vehicle, the supercharger 28 is arranged beside the cylinder head 25. As seen from the side of the vehicle, at least a part of the supercharger 28 is positioned above the upper surface of the engine 5, in other words is positioned higher than the upper surface of the cylinder head cover 26.

The flywheel housing 6 is disposed behind the engine 5. The hydraulic pump 7 is disposed behind the flywheel housing 6, and is attached to the flywheel housing 6. The hydraulic pump 7 is linked to the output shaft of the engine 5 via the flywheel. The hydraulic pump 7 is driven to discharge hydraulic fluid by the drive force from the engine 5.

The main vehicle body 3 includes an air cleaner 33 and a duct 34. The air cleaner 33 and the duct 34 are positioned lower than the upper surface 13a of the engine cover 13. The air cleaner 33 is disposed over the engine 5. The air cleaner 33 is fixed to the engine cover 13. The air cleaner 33 is cylindrical in shape. The central axial line Ax5 of the air cleaner 33 shown in FIG. 2 is disposed approximately horizontally to extend along the vehicle lateral direction. The air cleaner 33 has an intake port (not shown in the drawings) and an exhaust port 331 (refer to FIGS. 2 and 4). The intake port is connected to a head portion 35 (refer to FIG. 1) via a pipe member not shown in the figures. The head portion 35 protrudes upward from the upper surface of the engine cover 13. The exhaust port 331 is provided on the side of the air cleaner 33. The exhaust port 331 is positioned higher than the supercharger 28 described above.

The duct 34 connects the air cleaner 33 and the engine 5. The duct 34 extends downwards from the exhaust port 331 of the air cleaner 33, and has a shape that is curved towards the supercharger 28. As shown in FIG. 4, the duct 34 comprises a first connection portion 36, a second connection portion 37, and a vibration absorption portion 38. The first connection portion 36 is connected to the engine 5. Specifically, the first connection portion 36 is connected to the supercharger 28. The second connection portion 37 is connected to the air cleaner 33. The second connection portion 37 is connected to the exhaust port 331 of the air cleaner 33. In the duct 34, the vibration absorption portion 38 is positioned between the first connection portion 36 and the second connection portion 37. The vibration absorption portion 38 has the shape of a bellows.

Structure of the Exhaust Treatment Apparatus

The main vehicle body 3 comprises a first exhaust treatment device 41, a second exhaust treatment device 42, a relay connection pipe 43, a first connection pipe 45, and a second connection pipe 46. The first connection pipe 45 connects the engine 5 and the first exhaust treatment device 41. In more detail, the first connection pipe 45 connects together the aforementioned supercharger 28 and the first exhaust treatment device 41. The second connection pipe 46 connects to the second exhaust treatment device 42, and discharges exhaust from the engine 5 that has been treated by the second exhaust treatment device 42. The second connection pipe 46 is connected to an exhaust pipe 47 which is illustrated in FIG. 1. The exhaust pipe 47 is arranged to protrude upwards from the engine cover 13.

In this embodiment, for example, the first exhaust treatment device 41 is a diesel particulate filter device, and treats exhaust from the engine 5 that is fed via the first connection pipe 45. The first exhaust treatment device 41 collects, with a filter, particulate matter (PM) included in the exhaust. The first exhaust treatment device 41 incinerates the collected particulate matter, using a heater attached to the filter.

As shown in FIGS. 3 and 4, the first exhaust treatment device 41 is disposed in front of the engine 5 at a forefront position within the engine cover 13. The cooling device 14 is not housed inside the engine cover 13, but is disposed behind the cab 12, so that such configuration can be created. Moreover, the first exhaust treatment device 41 is disposed lower than the upper surface of the engine 5. Specifically, the first exhaust treatment device 41 is disposed lower than the upper surface of the cylinder head cover 26. Also, the first exhaust treatment device 41 is disposed higher than the bottom surface of the oil pan 23.

As shown in FIGS. 3 to 5, the first exhaust treatment device 41 has a generally cylindrical external shape. The dimension of the first exhaust treatment device 41 in the vehicle lateral direction is greater than that of the engine 5 in the vehicle lateral direction. As shown in FIG. 5, the first exhaust treatment device 41 is arranged so that its central axial line Ax1 extends along the vehicle lateral direction. The longitudinal direction of the first exhaust treatment device 41 extends along the vehicle lateral direction.

As shown in FIGS. 3 to 5, the first exhaust treatment device 41 includes a first connection port 41a and a second connection port 41b. As shown in FIGS. 4 and 5, the first connection pipe 45 is connected to the first connection port 41a. As shown in FIGS. 3 and 5, the relay connection pipe 43 is connected to the second connection port 41b.

As shown in FIG. 4, the first connection port 41a protrudes obliquely upward. Specifically, the first connection port 41a protrudes upward and, moreover, obliquely toward the engine 5. Correspondingly, the first connection pipe 45 extends obliquely downward toward the first exhaust treatment device 41 from the position where it is connected to the engine 5. Due to this, the first exhaust treatment device 41 is disposed at a position such that it does not overlap the engine 5 in a top view. At least one of the first exhaust treatment device 41 and the second exhaust treatment device 42 is disposed at a position such that at least the one of them does not overlap the engine 5 in a top view.

As shown in FIG. 3, the second connection port 41b is inclined slightly forward from the vertical direction. Due to this, as shown in FIG. 2, in a top view, the central axial line Ax3 of a straight line portion 43b (to be described in detail hereinafter) of the relay connection pipe 43 is positioned slightly forward of the central axial line Ax1.

The relay connection pipe 43 connects the first exhaust treatment device 41 and the second exhaust treatment device 42. As shown in FIGS. 3 and 5, the external diameter of the relay connection pipe 43 is smaller than the external diameter of the first exhaust treatment device 41 and the external diameter of the second exhaust treatment device 42. One end of the relay connection pipe 43 is connected to the second connection port 41b of the first exhaust treatment device 41. The other end of the relay connection pipe 43 is connected to a third connection port 42a of the second exhaust treatment device 42. The relay connection pipe 43 is disposed in front of the engine 5, and, moreover, above the first exhaust treatment device 41. Furthermore, as shown in FIG. 5, as seen from the front of the vehicle, the relay connection pipe 43 is overlapped over a part of the first connection pipe 45. Moreover, as shown in FIG. 4, the relay connection pipe 43 passes through a position close to the first connection pipe 45.

As shown in FIG. 5, the relay connection pipe 43 comprises a first curved portion 43a, a straight line portion 43b, and a second curved portion 43c. The straight line portion 43b is positioned above the first exhaust treatment device 41. As shown in FIGS. 2 and 5, the straight line portion 43b is arranged so that its central axial line Ax3 extends along the vehicle lateral direction. The straight line portion 43b is arranged so that its central axial line Ax3 is parallel to the central axial line Ax1 of the first exhaust treatment device 41. The longitudinal direction of the relay connection pipe 43 extends along the vehicle lateral direction. The first curved portion 43a couples together the straight line portion 43b and the second connection port 41b. The second curved portion 43c couples together the straight line portion 43b and the third connection port 42a of the second exhaust treatment device 42. An injector 44 is attached in the first curved portion 43a. The injector 44 injects a reducing agent into the interior of the relay connection pipe 43. The reducing agent may, for example, be aqueous urea. The details of the shapes of the injector 44 and the first curved portion 43a will be described hereinafter.

In this embodiment, as an example, the second exhaust treatment device 42 is a selective catalytic reduction device. The second exhaust treatment device 42 treats the exhaust from the engine 5 that has been treated by the first exhaust treatment device 41. The second exhaust treatment device 42 selectively reduces nitrogen oxides (NOx).

The second exhaust treatment device 42 has a generally cylindrical external shape. As shown in FIG. 5, the second exhaust treatment device 42 is arranged so that its central axial line Ax2 extends along the vehicle lateral direction. Moreover, the second exhaust treatment device 42 is arranged so that its central axial line Ax2 is parallel to the central axial line Ax1 of the first exhaust treatment device 41. The longitudinal direction of the second exhaust treatment device 42 extends along the vehicle lateral direction.

As shown in FIGS. 3 and 4, the second exhaust treatment device 42 is disposed forward of the engine 5. In more detail, the second exhaust treatment device 42 is arranged so that the central axial line Ax2 of the second exhaust treatment device 42 is forward of the front end of the engine 5. The second exhaust treatment device 42 is arranged so that the central axial line Ax2 of the second exhaust treatment device 42 is higher than the upper end of the relay connection pipe 43. The second exhaust treatment device 42 is arranged higher than the first exhaust treatment device 41 and the relay connection pipe 43. Because the relay connection pipe 43 is arranged above the first exhaust treatment device 41 and, moreover, below the second exhaust treatment device 42, the first exhaust treatment device 41, the relay connection pipe 43, and the second exhaust treatment device 42 are arranged in that order in the vertical direction. Moreover, the second exhaust treatment device 42 is disposed above the first connection pipe 45.

Furthermore, the second exhaust treatment device 42 is arranged to overlap a part of the first exhaust treatment device 41 in a top view. Moreover, the second exhaust treatment device 42 is arranged to overlap a part of the engine 5 in a top view. As seen from the top of the vehicle, the second exhaust treatment device 42 has a part that is overlapped over the engine 5. In more detail, as shown in FIGS. 3 and 4, the second exhaust treatment device 42 is disposed to overlap the belt 27 of the engine 5 in a top view.

Now, in FIGS. 3 and 4, the center Az1 of the first exhaust treatment device 41 in the front-rear direction of the vehicle and the center Az2 of the second exhaust treatment device 42 in the front-rear direction of the vehicle will be considered. Az1 is a plane that extends along the vertical direction and that contains the central axial line Ax1. Moreover, Az2 is a plane that extends along the vertical direction and that contains the central axial line Ax2. In FIGS. 3 and 4, Az1 and Az2 are illustrated by straight lines. Suppose that a tangent line L contacts a first side surface in the front of its center Az1 in the front-back direction of the vehicle out of the side surfaces of the first exhaust treatment device, and a second side surface in the front of its center Az2 in the front-back direction of the vehicle out of the side surfaces of the second exhaust treatment device. The tangent line L slopes upward and backward. The front edge of the first exhaust treatment device 41 is positioned forward of the front edge of the second exhaust treatment device 42. Moreover, as seen from the side of the vehicle, the front edge of the relay connection pipe 43 is positioned forward of the tangent line L. Furthermore, as seen from the side of the vehicle, the rear edge of the relay connection pipe 43 is positioned rearward of the tangent line L.

As shown in FIGS. 4 and 5, the second exhaust treatment device 42 has a third connection port 42a and a fourth connection port 42b. The relay connection pipe 43 is connected to the third connection port 42a. The second connection pipe 46 is connected to the fourth connection port 42b. The second connection pipe 46 is connected to the second exhaust treatment device 42.

The third connection port 42a is tilted towards the front slightly downwards from the horizontal direction. The fourth connection port 42b protrudes obliquely upward. Specifically, the fourth connection port 42b protrudes obliquely upward and toward the engine 5. Due to this, the second connection pipe 46 protrudes upward obliquely over the engine 5. Thus, the engine cover 13 can be lowered, as compared to a configuration in which the fourth connection port 42b is directed upwards. The upper portion of the second connection pipe 46 protrudes upward from the engine cover 13.

The engine 5, the first connection pipe 45, the first exhaust treatment device 41, the relay connection pipe 43, the second exhaust treatment device 42, the second connection pipe 46, and the exhaust conduit 47 are connected in series in that order. Accordingly, the exhaust from the engine 5 passes through the first connection pipe 45 and is fed into the first exhaust treatment device 41. Particulate matter in the exhaust is mostly reduced by the first exhaust treatment device 41. Next, the exhaust passes through the relay connection pipe 43, and is fed into the second exhaust treatment device 42. NOx in the exhaust is mostly reduced by the second exhaust treatment device 42. Thereafter, the cleaned exhaust passes through the second connection pipe 46 and the exhaust pipe 47, and is discharged to the exterior.

Positional Relationship of the Exhaust Treatment Devices, the Air Cleaner, and the Engine, and the Shape of the Engine Cover As shown in FIGS. 2 to 4, the first exhaust treatment device 41, the relay connection pipe 43, the second exhaust treatment device 42, and the air cleaner 33 are arranged to surround the front and the top of the engine 5. Therefore, it is possible to arrange the first exhaust treatment device 41, the relay connection pipe 43, the second exhaust treatment device 42, and the air cleaner 33 tightly close to one another.

Next, correspondence between the positions of the exhaust treatment devices and the air cleaner 33 or the like and the shape of the engine cover 13 will be explained. As shown in FIGS. 3 to 5, the engine cover 13 covers the engine 5, the air cleaner 33, the first exhaust treatment device 41, the second exhaust treatment device 42, the relay connection pipe 43, and the injector 44. As shown in FIGS. 3 and 4, the upper surface 13a of the engine cover 13 extends along the second exhaust treatment device 42 and the air cleaner 33. The front surface 13b of the engine cover 13 extends along the first exhaust treatment device 41 and the relay connection pipe 43. The engine cover 13 also has a curved surface 13c that smoothly connects together its upper surface 13a and its front surface 13b. Due to the curved surface 13c, the region of the upper portion of the blade 15 that the operator is able to check visually is extended.

FIG. 1 illustrates the details of this situation. FIG. 1 illustrates the region of the upper portion of the blade 15 that can be visually checked from the point of view 100 of an operator who is sitting in the cab 12, as the region between straight lines 110 and 120. The point of view 100 corresponds to the position of a filament position center point (FPCP) as defined in the specification of ISO 5006. The point of view 100 is a point that is 680 mm upward in the vertical direction from the seat index point (SIP) as defined in the specification of ISO 5006. The straight line 110 is the straight line joining the point of view 100 and the upper edge of the blade 15. And the straight line 120 is the straight line passing through the point of view 100 and contacting the engine cover 13.

In FIG. 1, the straight line 120 is tangent to the curved surface 13c, and it will be understood that provision of the curved surface 13c causes extension of the region of the upper portion of the blade 15 that the operator is able to check visually. Moreover, as shown in FIG. 1, as seen from the side of the vehicle, the straight line that joins the point of view 100 and the upper edge of the blade 15 is positioned higher than the engine cover 13.

Structure of the Brackets that Support the Exhaust Treatment Devices, Etc.

As shown in FIGS. 3 and 4, the main vehicle body 3 includes a mounting bracket 50, a first support bracket 70, a second support bracket 80, a rear mounting bracket 90, and dampers 31L, 31R, 32L, and 32R. The mounting bracket 50 is disposed within the engine cover 13. The mounting bracket 50 and the rear mounting bracket 90 support the engine 5 upon the vehicle body frame 10 via the dampers 31L, 31R, 32L, and 32R.

As shown in FIG. 3, the damper 31L is supported by the mounting bracket support portion 10a of the vehicle body frame 10. As shown in FIG. 4, the damper 31R is supported by the mounting bracket support portion 10b of the vehicle body frame 10. The mounting bracket 50 is attached to the vehicle body frame 10 via the dampers 31L and 31R. The dampers 31L and 31R include internal elastic members made from rubber or the like. Accordingly, the mounting bracket 50 is elastically supported on the mounting bracket support portions 10a and 10b of the vehicle body frame 10 via the dampers 31L and 31R.

As shown in FIGS. 3 and 4, the mounting bracket 50 is attached to the engine 5 by a first connection portion 52, a second connection portion 61, and a third connection portion 64. Accordingly, the engine 5 is elastically supported upon the vehicle body frame via the mounting bracket 50 and the dampers 32L and 32R.

The mounting bracket 50 supports the first support bracket 70 and the second support bracket 80. The first support bracket 70 is attached to the mounting bracket 50, and directly supports the first exhaust treatment device 41. As shown in FIG. 5, the first exhaust treatment device 41 is fixed to the first support bracket 70 by wire shaped fixing members 78 and 79. Accordingly, the first exhaust treatment device 41 is elastically supported upon the vehicle body frame 10 via the first support bracket 70 and the mounting bracket 50.

The second support bracket 80 is attached to the mounting bracket 50, and directly supports the second exhaust treatment device 42. As shown in FIG. 5, the second exhaust treatment device 42 is fixed to the second support bracket 80 by wire shaped fixing members 88 and 89. Accordingly, the second exhaust treatment device 42 is elastically supported upon the vehicle body frame 10 via the second support bracket 80 and the mounting bracket 50.

As shown in FIG. 3, the damper 32L is supported by the mounting bracket support portion 10c of the vehicle body frame 10. As shown in FIG. 4, the damper 32R is supported by the mounting bracket support portion 10d of the vehicle body frame 10. The rear mounting bracket 90 is attached to the vehicle body frame 10 via the dampers 32L and 32R. The dampers 32L and 32R include internal elastic members made from rubber or the like. Accordingly, the rear mounting bracket 90 is elastically supported on the mounting bracket support portions 10c and 10d of the vehicle body frame 10 via the dampers 32L and 32R.

As shown in FIGS. 3 and 4, the rear mounting bracket 90 is attached to the rear surface of the flywheel housing 6. The engine 5 is connected to the rear mounting bracket 90 via the flywheel housing 6. Accordingly, the engine 5 is elastically supported upon the vehicle frame 10 via the rear mounting bracket 90 and the dampers 32L and 32R.

Figure 6:
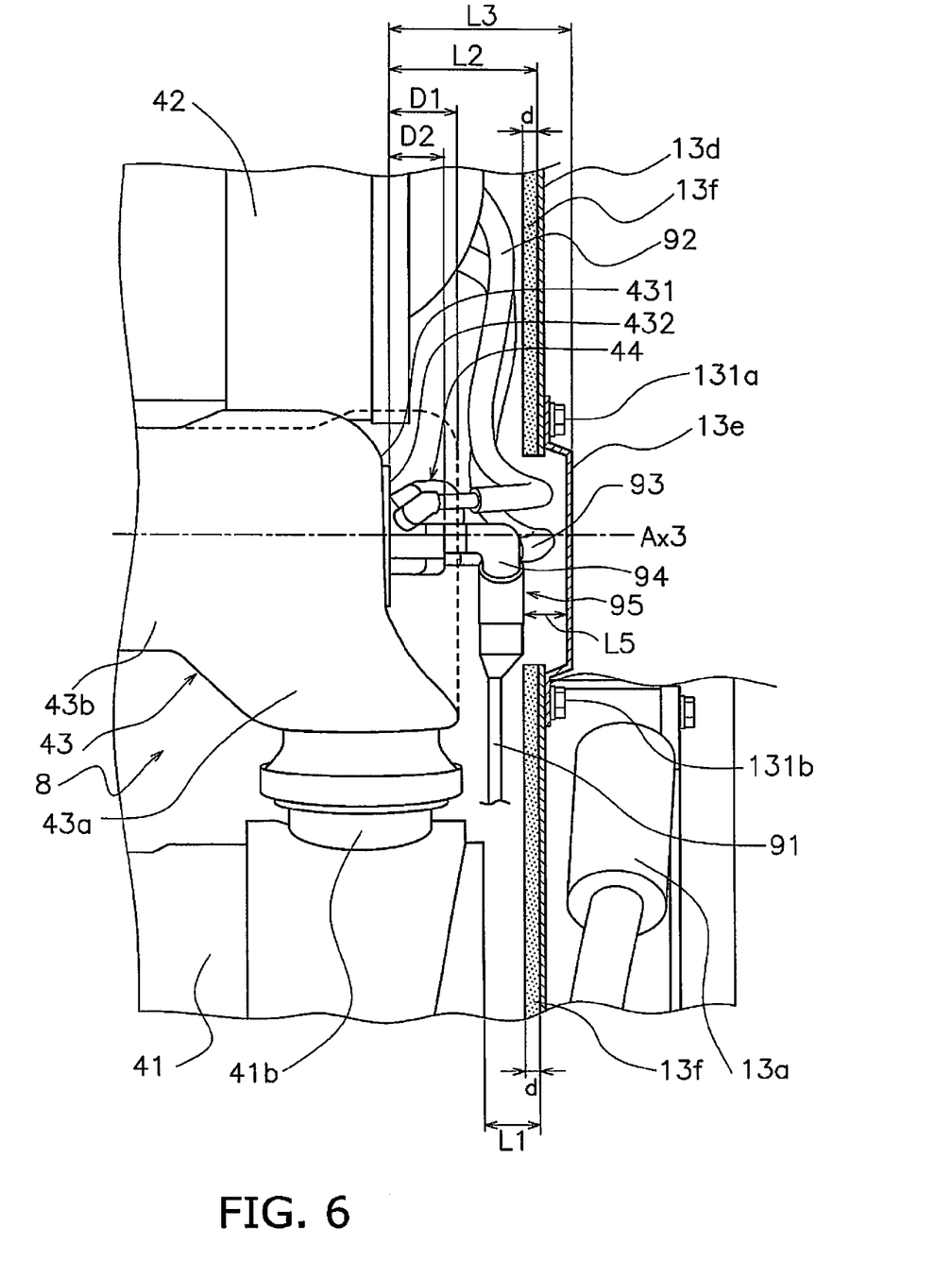
FIG. 6 is an enlarged view of the vicinity of an injector as seen from the front of the vehicle.

Positional Relationship of the First Curved Portion of the Relay Connection Pipe and the Injector FIG. 6 is an enlarged view of the vicinity of the injector 44, as seen from the front of the vehicle. As shown in FIG. 6, the injector 44 is attached to an attachment surface 432 provided upon an offset portion 431 of the first curved portion 43a. In FIG. 6, the external shape of the relay connection pipe 43 assumed not to have the offset portion 431 is illustrated by a dotted line (hereinafter this will be referred to as a "first external shape"). Moreover, in FIG. 6, the cross sectional shapes of a side surface 13d, a heat insulating member 13f, and a bulging portion 13e, which will be described hereinafter, are illustrated, while other portions of the structure in the engine compartment 8 are appropriately omitted. The attachment surface 432 is provided on the offset portion 431, which is indented from the first external shape towards the central axial line Ax3 of the second connection port 41b. The dimension D1 of the offset of the offset portion 431 in the longitudinal direction Ax3 of the relay connection pipe 43 is greater than the length D2 of the injector 44 in the longitudinal direction Ax3 of the relay connection pipe 43.

Here, as shown in FIGS. 1, 5, and 6, the side surface of the engine cover 13 closest to the injector 44 is denoted as 13d. When, as shown in FIG. 6, the distance between the side surface 13d and the first exhaust treatment device 41 in the longitudinal direction Ax3 of the relay connection pipe 43 is denoted as L1 and the distance between the side surface 13d and the attachment surface 432 in the longitudinal direction Ax3 of the relay connection pipe 43 is denoted as L2, then L1<L2. Moreover, the distance (L2-D2) between the side surface 13d and the injector 44 in the longitudinal direction Ax3 of the relay connection pipe 43 is greater than the distance L1.

A pipe 91 for supplying a reducing agent to the injector 44 from a reducing agent tank not shown in the figures, a pipe 92 for supplying cooling water to the injector 44 from the cooling device 14, and a pipe 93 for returning the water to the cooling device 14 after it has been heated up by the relay connection pipe 43, are connected to the injector 44. The pipe 92 may be the pipe for returning the water to the cooling device 14 after it has been heated up by the relay connection pipe 43, and the pipe 93 may be the pipe for supplying cooling water to the injector 44 from the cooling device 14. A letter-L shaped plug 94 may also be provided for connecting the injector 44 to the end portion of the pipe 92. In this exemplary embodiment, the combination of the pipes 91, 92, and 93 connected to the injector 44 is referred to as an "injector assembly 95".

Because a chemical reaction takes place in the relay connection pipe 43 and the second exhaust treatment device 42, they heat up. Therefore it is desirable for the heat insulating member 13f to be provided on the interior of the engine cover 13. FIGS. 5 and 6 illustrate an example of how a heat insulating member 13f of thickness d is disposed on the interior of the side surface 13d. In FIGS. 5 and 6, the region illustrated by the dotted pattern corresponds to the heat insulating member 13f. As shown in FIG. 6, at least parts of the pipes 91, 92, and 93 and the plug 94 are positioned outside of the heat insulating member 13f. Accordingly, in this exemplary embodiment, as shown in FIGS. 1 to 3, 5, and 6, a bulging portion 13e is provided upon the portion of the side surface 13d that corresponds to the injector 44. The side surface 13d includes the bulging portion 13e.

Desirably, the bulging portion 13e is formed by a cover that is a separate body from the engine cover 13. In this case, as shown in FIG. 6, the bulging portion 13e is fixed to the side surface 13d by bolts 131a and 131b. In FIG. 3, the bulging portion 13e is illustrated by chain double dashed lines. As shown in FIG. 3, the bulging portion 13e covers almost the whole region that corresponds to the injector 44, as seen from the side of the vehicle. Due to this, a gap of the distance L3 (L3>L2) in the longitudinal direction Ax3 of the relay connection pipe 43 is provided between the bulging portion 13e and the attachment surface 432 in the region that corresponds to the injector 44. Accordingly, it is possible to secure sufficient space for disposing the pipes 91, 92, and 93 and the plug 94. It should be understood that the distance L3 between the bulging portion 13e and the attachment surface 432 is greater than the length D2 of the injector 44 in the longitudinal direction Ax3 of the relay connection pipe 43.

Here, the distance between the injector assembly 95 and the bulging portion 13e is referred to as L5. The distance L5 corresponds to the distance between the bulging portion 13e and rigid portions on the pipes 91, 92, and 93 which is connected to the injector 44 and is hard to bend. The distance L5 is the distance between the plug 94 and the inner wall of the bulging portion 13e. This distance L5 is substantially equal to the distance L1 between the side surface 13d and the first exhaust treatment device 41. The absolute value of the difference between the distance L1 and the distance L5 is smaller than 5% of the width W2 of the engine cover 13 in the vehicle lateral direction (refer to FIG. 2). More desirably, the absolute value of the difference between the distance L1 and the distance L5 is smaller than 2% of the width W2 of the engine cover 13 in the vehicle lateral direction (refer to FIG. 2). The difference between the distance L1 and the distance L5 is less than 50 mm. More desirably, the difference between the distance L1 and the distance L5 is less than 20 mm.

Even though the bulging portion 13e is provided to the engine cover 13, the distance W1 between the first cylinder 16a and the second cylinder 16b is longer than the width W2 of the engine cover 13 in the longitudinal direction Ax3 of the relay connection pipe 43 at the position of the injector 44, as shown in FIG. 2. The distance W1 between the first cylinder 16a and the second cylinder 16b is longer than the width W2 of the engine cover 13 in the vehicle transverse direction at the position of the injector 44. It should be understood that the distance W1 between the first cylinder 16a and the second cylinder 16b means the distance between the portion of the first cylinder 16a that is closest to the second cylinder 16b and the portion of the second cylinder 16b that is closest to the first cylinder 16a.

Moreover, FIG. 1 illustrates a straight line that indicates as a dot and dash line UL an upper end of the first cylinder 16a when the first cylinder 16a is positioned at its uppermost position in the range of motion of the first cylinder 16a. According to this, as seen from the side of the vehicle, the range of motion of the first cylinder 16a is not overlapped with the bulging portion 13e. Among the first cylinder 16a, the second cylinder 16b, the third cylinder 16c, and the fourth cylinder 16d, the range of motion of the cylinder closest to the bulging portion 13e is not overlapped with the bulging portion 13e, as seen from the side of the vehicle. Accordingly, even supposing that the aforementioned width W2 is greater than the aforementioned distance W1, still there is no interference between the bulging portion 13e and the first cylinder 16a that is closest to the bulging portion 13e.

Characteristics

The bulldozer 1 according to this exemplary embodiment can have the following characteristics.

The first exhaust treatment device 41, the second exhaust treatment device 42, and the relay connection pipe 43 are disposed in front of the engine 5. Accordingly, it is possible to prevent increase of height of the upper surface of the engine cover 13, even though the first exhaust treatment device 41, the second exhaust treatment device 42, and the relay connection pipe 43 are housed in the engine compartment 8. As a result, it is possible to extend the region visible to the operator on the upper portion of the blade 15 of the working implement 4, so that it is possible to prevent deterioration of the workability.

Furthermore, the first exhaust treatment device 41, the relay connection pipe 43, and the second exhaust treatment device 42 are arranged in sequence such that the longitudinal directions thereof extend along the vehicle lateral direction. Moreover, the attachment surface for the injector 44 on the relay connection pipe 43 is provided upon an offset portion 431 of the relay connection pipe 43 at the connection portion between the first exhaust treatment device 41 and the relay connection pipe 43. Yet further, the distance L5 between the injector assembly 95 and the side surface 13d of the engine cover 13 that is closest to the injector assembly 95 is substantially equal to the distance L1 between the side surface 13d and the first exhaust treatment device 41. By setting the distance L5 between the side surface 13d of the engine cover 13 and the injector assembly 95 to be substantially equal to the distance L1 between the side surface 13d and the first exhaust treatment device 41 in this manner, the distance is set to minimize the gap at which there is no interference due to vibration generated when the bulldozer 1 is being operated. Therefore, it is possible to suppress increase of the engine compartment 8 in the longitudinal dimension and in the lateral dimension.

The distance L3 in the longitudinal direction of the relay connection pipe 43 between the bulging portion 13e and the attachment surface 432 is greater than the length D2 of the injector 44 in the longitudinal direction of the relay connection pipe 43. Due to this, even though the injector 44 is connected to the relay connection pipe 43, the injector 44 does not project in the longitudinal direction of the relay connection pipe 43 from the other components (the relay connection pipe 43, the first exhaust treatment device 41, and the second exhaust treatment device 42). As a result, it is possible to prevent increase in the lateral width of the engine compartment 8.

The distance between the first cylinder 16a and the second cylinder 16b is greater than the width of the engine cover 13 in the longitudinal direction of the relay connection pipe 43 at the position of the injector 44. Due to this, there is no interference between the cylinders that actuate the blade 15 and the engine cover 13.

The side surface 13d of the engine cover 13 closest to the injector 44 has the bulging portion 13e that corresponds to the position of the injector 44. Due to this, it is possible to secure sufficient space for arranging the pipes 91, 92, and 93 and the plug 94 that are attached to the injector 44.

The bulging portion 13e is formed as a cover that is a separate body from the engine cover 13. Due to this, before taking off the engine cover 13, it is possible to take off the cover equivalent to the bulging portion 13e, and to remove the pipes 91, 92, and 93 and the plug 94 and so on which are attached to the injector 44. Accordingly, it is possible to prevent difficulty to take off the engine cover 13 due to the pipes 91, 92, and 93 and the plug 94 and so on, which are attached to the injector 44, coming into contact with the engine cover 13 when taking off the engine cover 13.

As seen from the side of the vehicle, the range of movement of that one of the first cylinder 16a and the second cylinder 16b that is closest to the bulging portion 13e does not overlap the bulging portion 13e. Due to this, no interference takes place between the cylinders that actuate the blade 15 and the bulging portion 13e.

The relay connection pipe 43 is positioned above the first exhaust treatment device 41, and the second exhaust treatment device 42 is positioned above the relay connection pipe 43. Due to this, it is possible to raise the position of the bulging portion 13e to a position in which the range of movement of the cylinder 16a, which is the closest cylinder to the bulging portion 13e, does not overlap the bulging portion 13e, as seen from the side of the vehicle.

Modifications

While an exemplary embodiment of the present invention has been explained above, the present invention is not limited to the above described exemplary embodiment and various modifications are possible within the gist of the present invention.

In the exemplary embodiment described above, a case is explained in which the bulging portion 13e is provided upon the side surface 13d of the engine cover 13 that is closest to the injector 44. However, the bulging portion 13e may not be provided and the side surface 13d may be flat.

Figure 7:
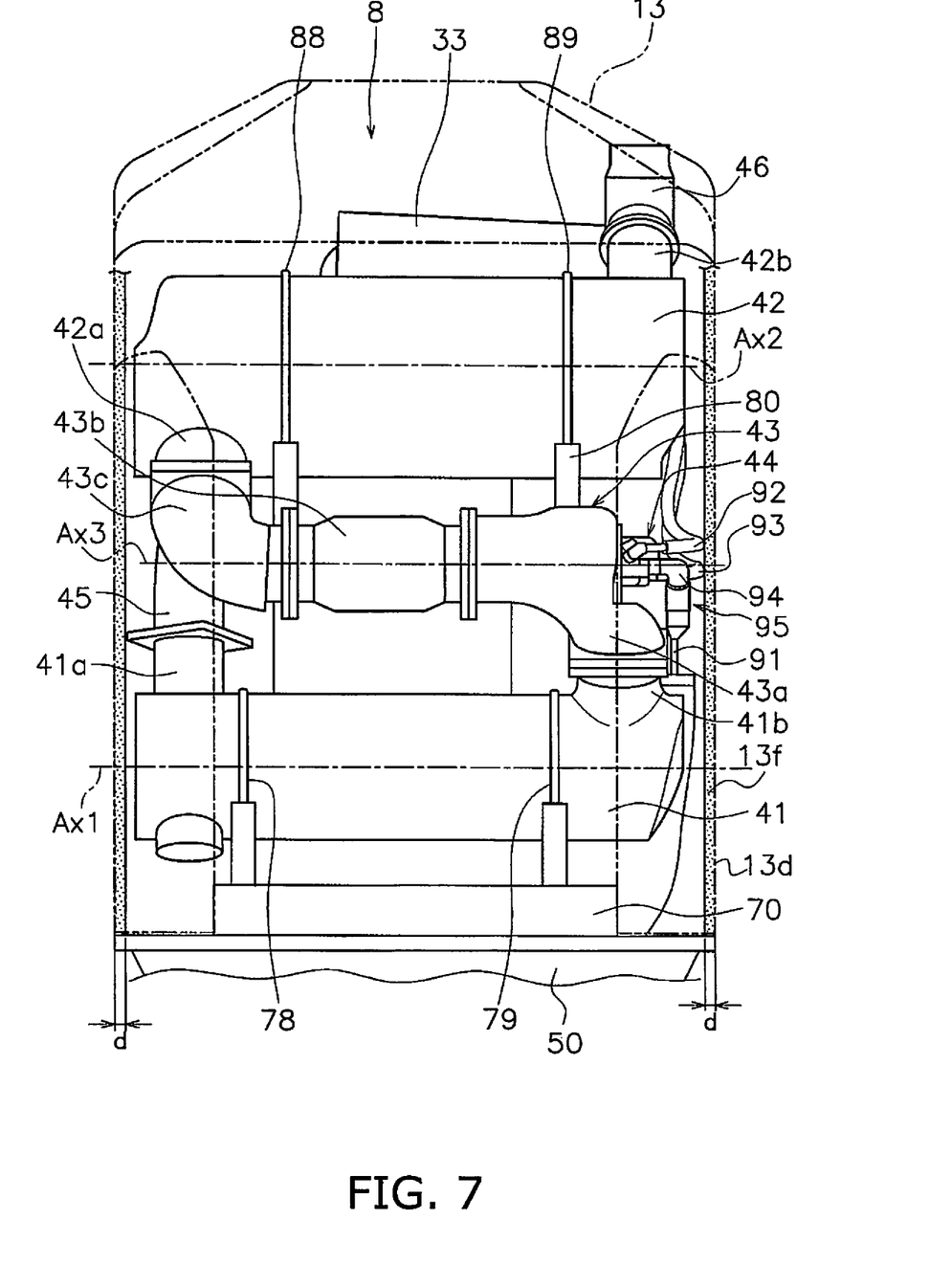
FIG. 7 is a front view illustrating the internal structure of a bulldozer according to a modification of the exemplary embodiment of the present invention.
Figure 8:
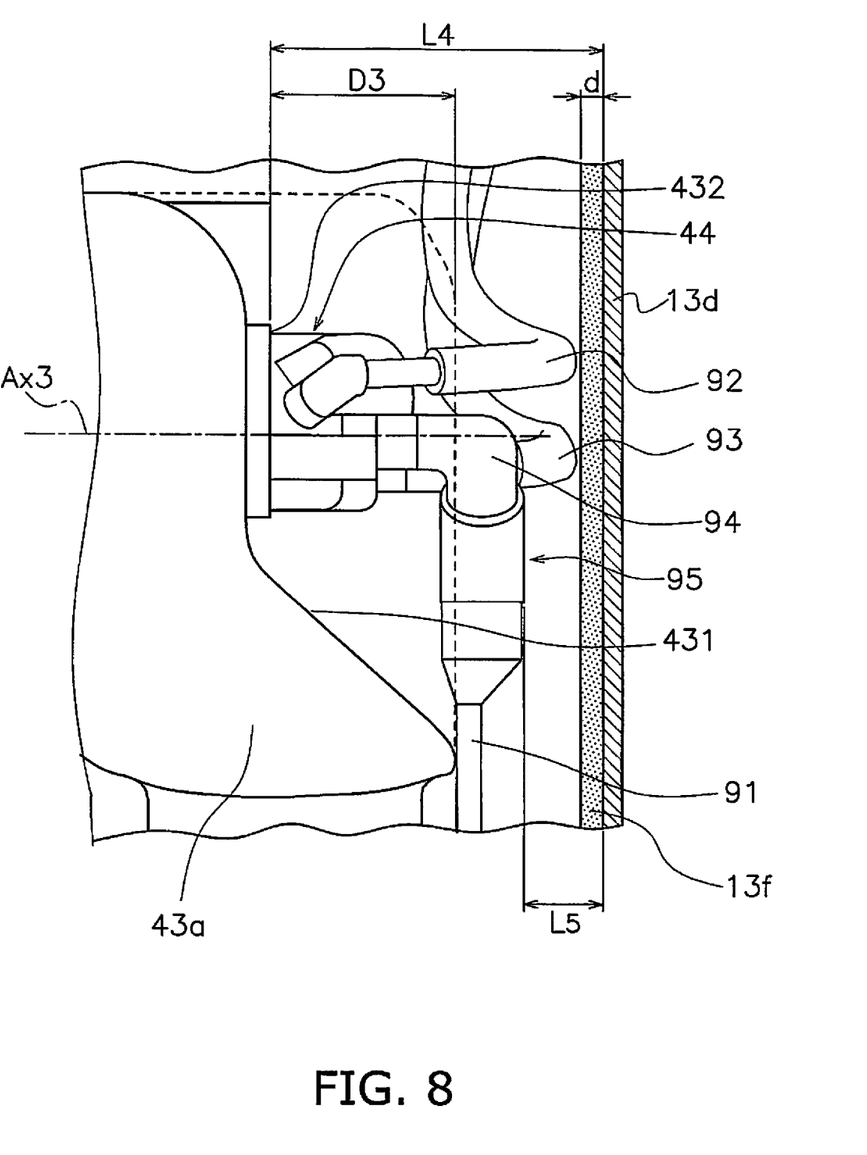
FIG. 8 is an enlarged view of the vicinity of an injector as seen from the front of the vehicle, according to the modification of the exemplary embodiment of the present invention.

FIG. 7 is a front view illustrating the internal structure of the engine compartment 8 of a bulldozer according to this modification. FIG. 8 is an enlarged view of the vicinity of the injector 44 according to this modification, as seen from the side of the vehicle. The first curved portion 43a assumed not to have the offset portion 431 is also illustrated in FIG. 8 by a dotted line. Moreover, the cross sectional shapes of the side surface 13d and the heat insulating member 13f are illustrated in FIG. 8. In this modification, the distance in the longitudinal direction Ax3 of the relay connection pipe 43 between the side surface 13d and the attachment surface 432 is changed from L2 to L4. Moreover, the size of the offset portion 431 in the longitudinal direction Ax3 of the relay connection pipe 43 may also be changed from D1 to D3.

In this modification, the heat insulating member 13f is also provided on the portion of the side surface 13d that corresponds to the injector 44. Accordingly, the distance (L4−d) between the attachment surface 432 and the heat insulating member 13f in the longitudinal direction Ax3 of the relay connection pipe 43 is longer than the aforementioned distance L2. The distance (L4−d) is preferably greater than or equal to L3. In this case as well as in the embodiment described above, the distance L5 between the injector assembly 95 and the side surface 13d is substantially equal to the distance L1 between the side surface 13d and the first exhaust treatment device 41.

With a large sized bulldozer 1, it is possible to elongate the distance between the attachment surface 432 and the heat insulating member 13f, without changing the size D1 of the offset portion 431, by widening the gap between the crawler belts 11 and the gap between the first cylinder 16a and the second cylinder 16b, and increasing the lateral width of the engine cover 13.

Alternatively, it is also possible to elongate the distance between the attachment surface 432 and the heat insulating member 13f, by increasing the size of the offset portion 431 of the relay connection pipe 43 in its longitudinal direction Ax3 from D1 to D3. In this case, it would not be necessary to widen the gap between the crawler belts 11 and the gap between the first cylinder 16a and the second cylinder 16b, and not to increase the lateral width of the engine cover 13. Also in this case, there is no interference between the cylinders actuating the blade 15 and the engine cover 13.

It should be understood that the shape of the engine cover 13, and in particular the shape of the bulging portion 13e, is not limited to the aforementioned shape, and it could be varied as appropriate. Moreover, the shapes of the injector 44, of the pipes 91, 92, and 93, and of the plug 94 are not limited to the aforementioned shapes, and they also could be varied as appropriate. Likewise the shapes of the mounting bracket 50 and of the rear mounting bracket 90 are not limited to the aforementioned shapes, and they also could be varied as appropriate. Furthermore, the shapes of the first support bracket 70 and of the second support bracket 80 are not limited to the aforementioned shapes, and they could be varied as appropriate. Yet further, the mounting bracket 50, the first support bracket 70, and the second support bracket 80 may be formed as a single integrated unit.

The exemplary embodiment described above shows a case in which the distance L5 is equal to the distance L1. However, the distance L5 may be equal to the distance between the second exhaust treatment device 42 and the side surface 13d.

In the exemplary embodiment described above, it is described that the first exhaust treatment device 41 is a diesel particulate filter device, while the second exhaust treatment device 42 is a selective catalytic reduction device. However, the first exhaust treatment device 41 may be a selective catalytic reduction device, while the second exhaust treatment device 42 may be a diesel particulate filter device. But, because it is desirable for the exhaust from the engine to be fed into the diesel particulate filter device first, in this case, the sequence and the orientations of the pipes that connect to the first exhaust treatment device 41 and the second exhaust treatment device 42 should be opposite.

It should be understood that the first exhaust treatment device 41 may not be a diesel particulate filter device, but may be a diesel oxidation catalyst (DoC).

There may be any number of dampers 31L, 31R, 32L, and 32R. However, it is desirable for the same number of dampers to be provided on the left side and on the right side.

According to exemplary embodiments of the present invention, it is possible to provide a bulldozer with which deterioration of the workability is prevented and the longitudinal length and the lateral width of the engine compartment are both minimized, even though a diesel particulate filter device and a selective catalytic reduction device are both housed in the engine compartment.

The invention claimed is:

1. A bulldozer, comprising:
a blade;
an engine;
a first exhaust treatment device treating exhaust from the engine, the first exhaust treatment device being disposed at the front of the engine;
a second exhaust treatment device treating exhaust from the engine, the second exhaust treatment device being disposed at the front of the engine;
a relay connection pipe connecting the first exhaust treatment device and the second treatment device, the relay connection pipe being disposed at the front of the engine;
an injector assembly attached to the relay connection pipe, the injector assembly including an injector injecting a reducing agent into an interior of the relay connection pipe; and
an engine cover covering the engine, the first exhaust treatment device, the second exhaust treatment device, the relay connection pipe, and the injector, the engine cover including an upper surface sloping forward and downward, and that covers said engine and said first exhaust treatment device,
wherein:
the first exhaust treatment device, the relay connection pipe, and the second exhaust treatment device are arranged in sequence such that the longitudinal directions thereof extend along the vehicle lateral direction;
an attachment surface for the injector on the relay connection pipe is provided on an offset portion of the relay connection pipe at a connection portion between the first exhaust treatment device and the relay connection pipe; and
the distance between the injector assembly and a first side surface of the engine cover closest to the injector assembly is substantially equal to the distance between the first side surface and the first exhaust treatment device.

2. A bulldozer according to claim 1, wherein the distance between the attachment surface and the first side surface in the longitudinal direction of the relay connection pipe is greater than the length of the injector in the longitudinal direction of the relay connection pipe.

3. A bulldozer according to claim 1, further comprising
a first cylinder controlling a position or a posture of the blade, the first cylinder being disposed at the left side of the engine cover; and
a second cylinder controlling the position or the posture of the blade, the second cylinder being disposed at the right side of the engine cover;
wherein the distance between the first cylinder and the second cylinder is greater than the width of the engine cover in the longitudinal direction of the relay connection pipe at the position of the injector.

4. A bulldozer according to claim 3, wherein the side surface of the engine cover closest to the injector assembly includes a bulging portion corresponding to the position of the injector.

5. A bulldozer according to claim 4, wherein the bulging portion is formed as a cover that is a separate body from the engine cover.

6. A bulldozer according to claim 4, wherein the range of movement of the cylinder closest to the bulging portion among the first cylinder and the second cylinder does not overlap the bulging portion, as seen from the side of the vehicle.

7. A bulldozer according to claim 6, wherein the relay connection pipe is positioned above the first exhaust treatment device, and the second exhaust treatment device is positioned above the relay connection pipe.

8. A bulldozer according to claim 3, wherein the side surface of the injector closest to the engine cover is flat.

9. A bulldozer according to claim 2, further comprising
a first cylinder controlling a position or a posture of the blade, the first cylinder being disposed at the left side of the engine cover; and
a second cylinder controlling the position or the posture of the blade, the second cylinder being disposed at the right side of the engine cover;
wherein the distance between the first cylinder and the second cylinder is greater than the width of the engine cover in the longitudinal direction of the relay connection pipe at the position of the injector.

10. A bulldozer according to claim 9, wherein the side surface of the engine cover closest to the injector assembly includes a bulging portion corresponding to the position of the injector.

11. A bulldozer according to claim 10, wherein the bulging portion is formed as a cover that is a separate body from the engine cover.

12. A bulldozer according to claim 11, wherein the range of movement of the cylinder closest to the bulging portion among the first cylinder and the second cylinder does not overlap the bulging portion, as seen from the side of the vehicle.

13. A bulldozer according to claim 12, wherein the relay connection pipe is positioned above the first exhaust treatment device, and the second exhaust treatment device is positioned above the relay connection pipe.

14. A bulldozer according to claim 13, wherein the side surface of the injector closest to the engine cover is flat.

* * * * *